United States Patent Office 3,736,266
Patented May 29, 1973

3,736,266
PREPARATION OF CARBON SUPPORTED
PALLADIUM CATALYSTS
Albert Schrage, East Orange, N.J., assignor to Dart
Industries Inc., Los Angeles, Calif.
No Drawing. Filed Aug. 18, 1971, Ser. No. 172,944
Int. Cl. B01j 11/06
U.S. Cl. 252—447
9 Claims

ABSTRACT OF THE DISCLOSURE

Palladium on carbon hydrogenation catalysts having increased activity may be prepared by adding a basic compound to a solution of a soluble palladium compound in the presence of finely divided carbon wherein the basic compound is uniformly added at such a rate that the pH of the solution, which is initially in the range of 0 to 3, rises to at least about 12 in a period of one-half to one hour, and then reducing the precipitated palladium to metallic palladium.

---

This invention relates to the production of supported hydrogenation catalysts and, in particular, to a method for obtaining a palladium on carbon catalyst having a higher hydrogenation catalytic activity.

In hydrogenation and other processes, it is conventional to use a catalyst which comprises a noble metal, such as palladium or platinum, in quantities of about 0.1–25% by weight deposited upon a support material. The aim in producing carbon supported metal catalysts is to obtain a high activity catalyst. Some of the primary considerations affecting activity are the uniformity of deposition of the metal on the carbon support and the surface area of the catalyst. A uniform, thin, firm and adherent coating on a high surface area support is desirable for maximum catalytic efficiency and activity. The support material for hydrogenation processes is preferably finely divided carbon which, by reason of its fine state of subdivision, requires deposition from an aqueous solution of a noble metal compound, followed by reduction to the metal. Processes of using such catalysts are well-known and reference to one such process is found in U.S. Pat. 2,823,235 for hydrogenation of nitro compounds to produce amines.

In the general prior art wherein palladium on carbon catalysts have been prepared by deposition from solution it has been the practice to use a basic precipitant, typically an alkali hydroxide, but without regard to pH. The precipitant has usually been added all at once to the solution of the noble metal compound or, alternatively, the precipitant has initially been added to the aqueous medium followed by addition of the noble metal halide and/or carbon. This latter procedure is entirely unsatisfactory as the resulting catalysts do not possess a desirable high activity.

According to this invention it has been found that palladium on carbon catalysts having unusually high hydrogenation activity can be prepared by controlling the sequence of addition of the materials to the aqueous medium, the final pH of the solution and the rate of change of the pH of the solution.

It is, accordingly, an object of this invention to provide a method of preparing high activity catalysts having uniform and controlled deposition of palladium on carbon and the high activity catalysts resulting therefrom.

The object of this invention is achieved by the novel process which comprises, in its essential step, the controlled addition of alkali hydroxide precipitant to an acidic aqueous solution of a soluble palladium compound containing particulate carbon having an initial pH of about 0 to 3 so that the pH of the solution increases to at least about 12 within a period of one-half to one hour. It is found, in accordance with this invention, that if the pH of the ultimate solution is not raised to at least about 12 in the subject process, catalytic hydrogenation activity is substantially reduced.

For purposes of this invention, catalytic hydrogenation activity is defined as the time, in minutes, required for a given sample of palladium on carbon catalyst to reduce hydrogen pressure from 50 p.s.i.g. to 35 p.s.i.g. in the presence of maleic acid. The specific method for determining the activity, is as follows. A sample of the wet catalyst (5% Pd on carbon) as prepared is partially dried over about a five minute period to a 50% by weight water content. One gram of the thus partially dried catalyst (25 mg. Pd) is charged to a 500 ml. hydrogenating flask under a nitrogen atmosphere. Then a solution of 23.3 g. of maleic acid in 100 ml. of methanol is charged to the flask. This amount of maleic acid, when completely reduced, causes a pressure drop from 50 p.s.i.g. to 35 p.s.i.g. Then the nitrogen is displaced with hydrogen to 50 p.s.i.g. pressure and the reaction is started by shaking the bottle fastened in the Parr hydrogenation apparatus. The time in minutes is recorded for the pressure to drop to 35 p.s.i.g. and this reading is used as the measure of the activity of the catalyst sample. Activities on the order of 9 minutes or less are desirable for maximum efficiency. For catalysts containing other than 5% Pd on carbon the sample size is appropriately adjusted to the 25 mg. of Pd standard.

More specifically, the process of the invention involves preparing an acidic aqueous solution of a soluble palladium compound having a pH of about 0 to 3, mixing therewith a powdered carbon to form a slurry containing 2 to 20% by weight solids, and thereafter gradually and substantially uniformly adding a basic precipitant to the slurry to raise the pH of the solution to at least about 12 within a period of one-half hour to one hour. Precipitation of palladium hydroxide onto the carbon generally begins at about a pH of 5 or 6 and is complete when a pH of 12 is reached. Thereafter, the palladium hydroxide is preferably reduced to metallic palladium by conventional procedures to form the palladium on carbon catalyst of high hydrogenation activity.

The palladium compound may be the chloride or other halide which are commercially available in the form of acidic aqueous solution. These solutions are typically extremely acidic having a pH of 0 to 3 to prevent hydrolysis; thus, it is not necessary to acidify the solution of palladium halide used in this preparation. Other soluble palladium compounds may be used, such as palladium nitrate or acetate, but usually require addition of HCl or other acid to make a low pH solution.

The carbon to be used must be of fine particulate quality for maximum activity of about 9 minutes or less. While powders are preferred, the method of this invention would conceptually also extend to carbon in the form of particles, granules, pellets and other particulate forms. It is preferred to use carbon powders wherein 80% of the particles are of 1–10 micron diameter and 100% are under 100 micron diameter. To obtain high surface area catalysts, i.e. on the order of 2000 m.$^2$/gm., the pore volume (calculated from pore radius and pore distribution) should be about 0.38 cc./gm. which is based on pore size (radius) of about 15–3000 A. Such a surface area is found with catalyst powders having particle sizes such that all the particles have diameters from 1 to 100 microns.

The precipitant, while including most basic substances in the prior art, must be, in this invention, one capable of raising pH to at least 12, such as an alkali or alkaline earth hydroxide, preferably lithium, sodium, potassium, barium, or cesium hydroxide in the form of a 5–50% aqueous solution. The respective carbonates or bicarbonates are not satisfactory, as they can only increase pH to 9–10.

As indicated previously, during addition of the precipitant the soluble palladium halide is converted to insoluble hydroxide which deposits on the carbon present in the solution. To obtain the catalyst in active form, the hydroxide must be reduced to metallic palladium. This can be effected by conventional means, such as by a separate reducing step using a reducing agent in the precipitating solution or by in situ reduction in the hydrogenation or other process by the hydrogen used therein. Such in situ reduction during the hydrogenation process itself conveniently avoids any necessity for a separate reduction step but does have certain drawbacks. For example, since the freshly precipitated palladium is in the hydroxide form it is susceptible of being converted back to the salt form in the presence of an acidic environment which might be present during the hydrogenation process. For this reason it is preferred to employ a separate reducing step and convert the palladium hydroxide to metallic palladium. Such reduction may conveniently be accomplished by adding a reducing agent to the slurry of precipitated palladium hydroxide on carbon. Any conventionally used reducing agent may be used such as formaldehyde, hydrazine, sodium formate glucose and other aldehyde-alcohols, etc.

It is also possible to add promoters or activators, for the palladium. Such promoters are minor amounts of other metals, metal oxides, hydroxides, etc. which are found to promote or increase the activity of the palladium in use. Such known promoters include manganese dioxide, chromic oxide, and other metals or metal oxides or hydroxide of Groups II–VIII of the Periodic Table of Elements. These promoters are, by definition, added in minor quantities by weight, typically on the order of one half to 3% by weight of the total catalyst. The exact proportion will vary with the amount of palladium used on the catalytic support.

After precipitation and reduction, if a separate reducing step is employed, the catalyst is recovered from solution by filtration and the filtered product is dried in a vacuum drier or oven preferably under an atmosphere of nitrogen or hydrogen, excluding oxygen, to reduce oxidation of the palladium. The catalyst should not be totally dried, since this produces an irreversible reduction in activity; rather the drying is only partial to remove excess water to a water content of about 45% to 55% by weight, preferably 50%, and this material is packaged and shipped in the wet state.

The invention herein is found to provide increased activity for all the typical palladium on carbon combinations. It is known in the art to use 0.1–25% by weight palladium deposited on the support. The concentration of palladium may be controlled by varying the quantity of palladium compound added initially. It is also known to form low concentration of palladium, e.g. 1%, by making a high e.g. 10%, catalyst and diluting it with added carbon powder. All such concentrations and techniques may be used in this invention.

The following examples will serve to further illustrate the invention:

EXAMPLE I (1) A slurry of 43 g. of carbon powder in 600 ml. of water is stirred for 5 minutes. To this are added 100 ml. of $Pd/Cl_2$ solution (100 g. Pd/l. 10% HCl). The mixture is stirred for 15 minutes. About 6 ml. of a 30% sodium hydroxide solution is then uniformly added over a 60 minute period causing the pH to change from 1.1 to 12.0. Formaldehyde (20 ml.) is then added in one portion and the mixture is stirred for one hour while additional alkali is added to maintain a pH of 11.0, the mixture is then heated to 90° C., cooled quickly and the pH is adjusted to 5.0 with conc. HCl. The slurry is filtered and washed seven times with water to give a product containing 67% of water. All filtrations were carried out under nitrogen to minimize oxidation. Drying to 50% water content was carried out by spreading the catalyst on paper in an envelope of polyethylene film through which a stream of nitrogen was passed. The catalyst had a palladium content of 20%.

(2) Procedure (1) above is repeated but the 6 ml. NaOH is added all at once in a period of about 5 seconds. The final pH was about 12.0.

(3) Procedure (1) above is repeated but the 6 ml. NaOH is divided into 5 equal 1.2 ml. portions and each portion is added in total at one minute intervals giving an addition time of 5 minutes. The final pH was about 12.0.

The catalysts produced in accordance with the above techniques, each containing about 50% water, were separately used to catalyze the hydrogenation of maleic acid using the same conventional procedure described earlier in the description and the activities of each were calculated based on the time (minutes) required to reduce hydrogen pressure from 50 p.s.i.g. to 35 p.s.i.g. The results are indicated in the following table:

TABLE I

Sample No.:
1 ............................................ Minutes
2 ............................................ About 6.2.[1]
3 ............................................ About 20.

[1] After 5 minutes the reduction in hydrogen pressure had only reached 49 p.s.i.g.

EXAMPLE II

The procedure of Example I (1) was repeated twice except that in Run 1 the addition of NaOH was terminated at a pH of 11 and in Run 2 at a pH of 12. The time for changing the pH to 11 was 40 minutes and a total of about 4.8 ml. NaOH was used. The time for changing the pH to 12 was 63 minutes and a total of about 4.7 ml. NaOH was used. The catalysts produced were recovered and tested for activity according to the procedure of Example I.

The results of the tests are shown in the following table:

TABLE II

Run 1

| Time (sec.): | $H_2$ (p.s.i.g.) |
|---|---|
| 9 | 59 |
| 60 | 50 |
| 120 | 50 |
| 180 | 50 |
| 240 | 49 |

Run 2

| Time (sec.): | $H_2$ (p.s.i.g.) |
|---|---|
| 0 | 50 |
| 12 | 49 |
| 53 | 48 |
| 85 | 47 |
| 113 | 46 |
| 135 | 45 |
| 165 | 44 |
| 185 | 43 |
| 205 | 42 |
| 225 | 41 |
| 250 | 40 |
| 260 | 39 |
| 283 | 38 |
| 300 | 37 |
| 337 | 35 |

EXAMPLE III

The procedure of Example I (1) was used to produce a 5% palladium containing catalyst by using 25 ml. $Pd/Cl_2$ solution. The resulting catalyst shows an activity of 4.9 minutes.

EXAMPLE IV

When the procedure of Example I (1) is repeated using, instead of 20 ml. formaldehyde as reducing agent, an equivalent quantity (2.5 ml.) of hydrazine the activity was about 5.7 minutes. When the procedure of Example III was repeated using 2.5 ml. hydrazine, the activity was 5.75 minutes.

EXAMPLE V

The procedure of Example I (1) was again followed to prepare several catalysts with the exceptions that in Run 1 the resulting wet catalyst comprising the filter cake was not subjected to any drying and contained 67% by weight water, in Run 2 the resulting wet catalyst was dried to 50% by weight water, in Run 3 the resulting wet catalyst was completely dried, and in Run 4 the resulting wet catalyst was completely dried and reconstituted to 50% by weight water. Each of the catalysts were tested for hydrogenation activity as described heretofore and the results are shown in the following table.

TABLE III

| Run No.: | Activity (min.) |
|---|---|
| 1 | 8.5 |
| 2 | 6.89 |
| 3 | 13.67 |
| 4 | 13.75 |

Thus, having described the invention in detail it will be understood to those skilled in the art that certain variations and modifications may be made without departing from the spirit and scope of the invention as herein described and defined in the appended claims.

I claim:

1. A process for producing carbon supported palladium catalysts comprising forming a slurry of particulate carbon and an acidic aqueous solution of a soluble palladium compound, said solution having a pH in the range from about 0 to about 3, said slurry containing from about 2 to about 20 percent by weight solids, adding a basic precipitant at a substantially uniform rate to raise the pH of the slurry to at least 12 within a period of one-half to one hour to precipitate a palladium material onto the carbon, and thereafter reducing the precipitated palladium material to its metallic form.

2. A process according to claim 1 wherein the soluble palladium compound is a palladium halide.

3. A process according to claim 2 wherein the palladium halide is palladium chloride.

4. A process according to claim 2 wherein the basic precipitant is an alkali or alkaline earth hydroxide.

5. A process according to claim 4 wherein the basic precipitant is potassium or sodium hydroxide.

6. A process according to claim 1 wherein the precipitated palladium material is reduced by hydrogen, formaldehyde, sodium formate, or glucose.

7. A process according to claim 1 wherein the carbon supported palladium catalyst is recovered from the slurry after reduction by filtering and drying to a water content of about 45% to 55% by weight.

8. A carbon supported catalyst containing 0.1 to 25% by weight palladium produced by the process which comprises forming a slurry of particulate carbon and an acidic aqueous solution of a soluble palladium compound, said solution having a pH in the range from about 0 to about 3, said slurry containing from about 2 to about 20 percent by weight solids, adding a basic precipitant at a substantially uniform rate to raise the pH of the slurry to at least 12 within a period of one-half to one hour to precipitate a palladium material onto the carbon, and thereafter reducing the precipitated palladium material to its metallic form.

9. A catalyst according to claim 8 further containing 0.5 to 3% by weight of a promoter selected from the palladium activating metals, oxides of metals, or hydroxides of metals of Groups II–VIII of the Periodic Table.

References Cited

UNITED STATES PATENTS

| | | | |
|---|---|---|---|
| 2,400,012 | 5/1946 | Littmann | 252—447 X |
| 2,823,235 | 2/1958 | Graham et al. | 252—447 X |
| 2,857,337 | 10/1958 | Hamilton et al. | 252—447 X |
| 3,127,356 | 3/1964 | Hamilton et al. | 252—447 |
| 3,271,327 | 9/1966 | McEvoy et al. | 252—447 X |
| 3,328,465 | 6/1967 | Spiegler | 252—447 X |

PATRICK P. GARVIN, Primary Examiner

U.S. Cl. X.R.

260—537 R